(12) United States Patent
Gatev

(10) Patent No.: US 9,065,843 B2
(45) Date of Patent: Jun. 23, 2015

(54) METHOD, SYSTEM AND ARTICLE OF MANUFACTURE FOR PROVIDING CONNECTIONS AND CONNECTION ALIASES DESCRIPTORS BY SERVICES AND LIBRARIES ARCHIVES

(75) Inventor: Andrei A. Gatev, Sofia (BG)

(73) Assignee: SAP SE, Walldorf (DE)

( * ) Notice: Subject to any disclaimer, the term of this patent is extended or adjusted under 35 U.S.C. 154(b) by 1248 days.

(21) Appl. No.: 12/029,677

(22) Filed: Feb. 12, 2008

(65) Prior Publication Data

US 2008/0270617 A1   Oct. 30, 2008

Related U.S. Application Data

(60) Provisional application No. 60/926,989, filed on Apr. 30, 2007.

(51) Int. Cl.
*H04L 29/08* (2006.01)
*G06F 21/62* (2013.01)
*G06F 9/445* (2006.01)

(52) U.S. Cl.
CPC ............ *H04L 67/14* (2013.01); *G06F 21/6281* (2013.01); *G06F 8/60* (2013.01); *G06F 8/61* (2013.01); *H04L 67/2842* (2013.01); *H04L 67/28* (2013.01); *H04L 67/143* (2013.01)

(58) Field of Classification Search
USPC .......................................... 709/222, 227, 245
See application file for complete search history.

(56) References Cited

U.S. PATENT DOCUMENTS

| | | | | |
|---|---|---|---|---|
| 6,584,507 | B1 * | 6/2003 | Bradley et al. | 709/229 |
| 6,721,777 | B1 * | 4/2004 | Sharma | 718/101 |
| 6,976,061 | B1 * | 12/2005 | Sharma | 709/220 |
| 7,069,553 | B2 * | 6/2006 | Narayanaswamy et al. | 717/173 |
| 7,089,584 | B1 * | 8/2006 | Sharma | 726/4 |
| 7,506,342 | B2 * | 3/2009 | Mousseau et al. | 719/320 |
| 7,536,409 | B2 * | 5/2009 | Barcia | 1/1 |
| 2002/0010910 | A1 * | 1/2002 | Crudele et al. | 717/4 |
| 2002/0129129 | A1 * | 9/2002 | Bloch et al. | 709/220 |
| 2003/0195997 | A1 * | 10/2003 | Ibert et al. | 709/318 |
| 2003/0212990 | A1 * | 11/2003 | Brodkorb et al. | 717/174 |
| 2004/0078495 | A1 * | 4/2004 | Mousseau et al. | 710/1 |
| 2005/0091655 | A1 * | 4/2005 | Probert et al. | 718/100 |
| 2005/0108702 | A1 * | 5/2005 | Baker et al. | 717/168 |
| 2005/0267918 | A1 * | 12/2005 | Gatev et al. | 707/203 |
| 2006/0259904 | A1 * | 11/2006 | Celli et al. | 717/174 |
| 2007/0245013 | A1 * | 10/2007 | Saraswathy et al. | 709/223 |
| 2008/0270617 | A1 * | 10/2008 | Gatev | 709/228 |

* cited by examiner

*Primary Examiner* — Backhean Tiv

(57) ABSTRACT

A method, system and machine accessible medium for establishing connectivity to a remote computer system by using connectivity objects descriptors provided with services and libraries SDAs. A service or in a library SDA provides a description of how to establish a connectivity object for accessing a remote system. When the SDAs are deployed on an application server, all packed descriptions are stored in a repository. The connectivity is established at server startup in accordance with the descriptions and is accessible for all applications, services and libraries while the server is running.

27 Claims, 3 Drawing Sheets

METHOD, SYSTEM AND ARTICLE OF MANUFACTURE FOR PROVIDING CONNECTIONS AND CONNECTION ALIASES DESCRIPTORS BY SERVICES AND LIBRARIES ARCHIVES

This application is related to U.S. Provisional Patent Application Ser. No. 60/926,989, entitled "Web Container et al.", filed Apr. 30, 2007, from which priority is claimed, and which is hereby incorporated by reference.

FIELD OF INVENTION

The field of invention relates generally to computer system connectivity, and, more specifically, to automated connection setup between separate computer systems at libraries and services deployment time.

BACKGROUND

Networking refers not just to collaboration between multiple users, but also collaboration between computer systems. Virtually every enterprise is running a plurality of separate computer systems. These systems often depend on each other to serve specific purposes. A computer system cannot work properly and provide the expected functionality if connectivity to another computer system is not established. An example of such symbiosis is an application server for running business applications in communication with at least one of a database server, a messaging server, and a legacy computer system.

There are different approaches for establishing communication between separate computer systems. The physical connectivity between the systems could be logically managed by a connectivity framework or a connectivity service to channel the information exchange. One or more connectivity services may be implemented in an application server to maintain communication to one or more remote systems. A set of connectivity objects is created and maintained in a connectivity service on an application server. Each connectivity object provides connections to a remote system to be used by a business process running on the application server when needed to access to the remote system. The connectivity objects may be manually established in accordance with the requirements. Alternatively, they may be setup automatically when an application is deployed on an application server (see US Patent application publication No. US 2005-0267918 A1).

In this application the terms connectivity service, connectivity object and connection are defined as follows.

Typically, when the connectivity is setup automatically, an application software archive packs instructions for establishing connectivity objects to specific remote systems, e.g. database server, messaging server, legacy system. Following the instructions, the connectivity objects are established when the application is deployed on an application server. These connectivity objects could be used only by the application which has delivered the instructions, and by those applications which have a reference to them. There are services and libraries which may also need to use the connectivity objects, established during application deployment. However, if the application is not running, application deployed connectivity is not available.

SUMMARY

A method, system and machine accessible medium for establishing connectivity to a remote computer system by using connectivity objects or connectivity objects aliases descriptors provided with software delivery archives (SDA) of services and libraries is disclosed. A SDA of a service or of a library describes how to establish a connectivity object or a connectivity object alias for accessing a remote system. When the SDA is deployed on an application server, all packed descriptions are stored in a repository. The connectivity is established at server startup in accordance with the descriptions and is accessible for all applications, services and libraries while the server is running.

BRIEF DESCRIPTION OF THE DRAWINGS

A better understanding of the present invention can be obtained from the following detailed description in conjunction with the following drawings, in which the invention is illustrated by way of example and not by way of limitation.

DETAILED DESCRIPTION

Embodiments of a method, system and machine accessible medium for providing connectivity objects descriptors by services and libraries SDAs are described herein.

As used herein the term "connectivity object" is an object, established within an application server connectivity service, which represents a remote system. Connectivity object is used by the processes running on the server to access the remote system. In one embodiment of the invention, the connectivity object may be thought of as a factory for connections to the particular remote system. A business process may use a connection for accessing the remote system. The term "connectivity object alias" is a reference to an existing connectivity object. Further, all references to "connectivity object" apply also to "connectivity object alias".

The term "process" means a sequence of related activities carried out to achieve a specific purpose. The term "connectivity establishment process" means a process aimed to create a connectivity object in an application server to provide connections to a remote system.

Embodiments of the invention involve describing connectivity objects in a SDA of a service or a library, when the service or the system needs to access a particular remote system. When a connectivity service starts in an application server, it checks for all delivered connectivity objects descriptions. After the check is complete, the connectivity service creates the connectivity objects and they become usable for all components running on the server, e.g. services, libraries and applications. Services and libraries that need to use the connectivity objects should have a reference to the connectivity service in order to ensure that it is started. The connectivity objects are available while the connectivity service is available.

Figure 1:
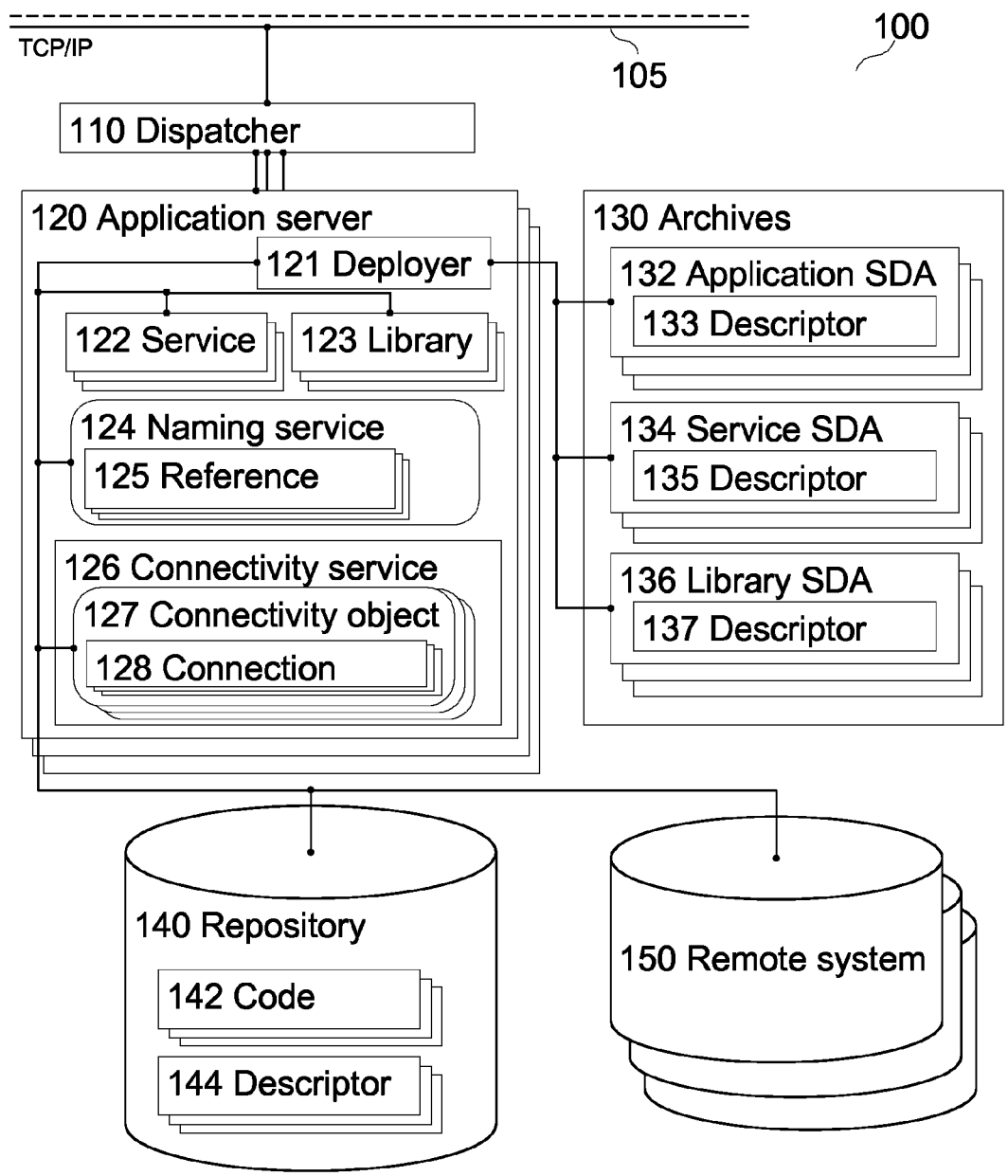
FIG. 1 illustrates a block diagram of a distributed system that implements automated establishment of connectivity with a remote system as instructed in descriptors provided by SDAs in accordance with an embodiment of the invention.

FIG. 1 illustrates a block diagram of distributed system 100 that implements automated establishment of connectivity with remote system 150 as instructed by descriptions packed in archives 130. In an embodiment of the invention, distributed system 100 may comprise a plurality of application servers as illustrated in the figure with application server 120. The plurality of application servers may be configured in a cluster. Dispatcher 110 receives business users' requests via network 105, and passes them to one of the servers in accordance with the current load or based on other rules. All application servers in distributed system 100 may resemble the structure and functionality of application server 120. There are different software technologies for building application servers and application server clusters. For example, the Java Enterprise Edition (JEE) system platform may be used.

In one embodiment of the invention, application server 120 runs a plurality of business applications to process business requests. However, not all required functionality is provided by the applications. There is also a plurality of components to ensure basic or common functionality, shared among different applications. These components are referred to as services and libraries in the specification. There are definitive differences between services and libraries which may vary between system platforms. For example, in the JEE platform, services are active components with definite life cycle that access and utilize system functionality. They can allocate resources at their startup time and are responsible to release them at shutdown time. Libraries in the JEE platform are used for sharing general bytecode between JEE components and applications. Bytecode is a binary representation of an executable program, usually more abstract than machine code. Libraries are not active components—they have no definite life cycle, do not allocate resources themselves, and do not keep any kind of configuration information in the system. It is responsibility of the component that uses a library to initialize it and construct the necessary objects.

Applications, services and libraries that should run on application server 120 are deployed first. Deployment is a process comprising several interrelated tasks, including installing, adapting, and activating of a software component. Installing, adapting and activating are general terms that mean insertion of executable software source code into a computer system, configuring it, and starting it respectively. On application server 120 this set of tasks is performed by deployer 121—a system module that accesses software delivery archives 130 where there is source code of the components. When a component is deployed on application server 120, an instance of the component could run on each application server if the plurality of application servers is configured as a cluster. Deployer 121 stores the component's executable code in repository 140 available to all application servers. When application server 120 is standalone, repository 140 may be an internal server module.

As discussed earlier, processing a business request often requires access to one or more remote systems. For example, a business request may involve extracting or updating data in an external database, or exchanging information with a legacy system. Connectivity service 126 provides a connectivity framework for establishing and maintaining communication with remote system 150. In one embodiment of the invention, application server 120 could communicate with a plurality of remote systems and may support separate connectivity services for each remote system or for each remote system type.

Remote system 150 is logically represented within connectivity service 126 by a plurality of connectivity objects 127. The components running on application server 120 access remote systems through connectivity objects 127. More precisely, in one embodiment of the invention, the logical communication of a component (e.g. application, service or library) with remote system 150 flows through connection 128. Connectivity object 127 provides a plurality of connections to be utilized by a plurality of business requests for simultaneous access to remote system 150.

When connectivity object 127 is established, it is registered in naming service 124 to be accessible for the components running on application server 120. To register or bind connectivity object 127 in naming service 124 means to associate common reference 125 to connectivity object 127. Using a naming service is a uniform way for a component to find and access a remote system. Without this binding, connectivity object 127 will be available only to those components in which the unique connectivity object reference information, including specific driver details, has been hardcoded. Service 122 and library 123 represent running components on application server 120 that use reference 125 to connectivity object 127 for accessing remote system 150.

In one embodiment of the invention, connectivity object 127 is established in accordance with descriptions packed in archives 130 together with the source code of the deployable components. This specification document is focused on establishing connectivity objects based on descriptions illustrated by descriptor 135 and descriptor 137, packed with service SDA 134 and library SDA 136, respectively. Descriptors 135 and 137 are stored in repository 130 in descriptor 144 when the respective service and library component are deployed. Code 142 is the executable code of the components.

Application SDA 134 and descriptor 133 imply that a connectivity object could be established based on instructions packed in application SDA as well (see US Patent application publication No. US 2005-0267918 A1). However, when a connectivity object is established based on descriptions provided by an application SDA, it is available only while the application is running. For services and libraries this obstacle is avoided by establishing all connectivity objects stored in descriptor 144 at connectivity service 126 start. When the JEE system platform is applied, a component that needs a connectivity object may include a descriptor with the connectivity object definition under particular entry in the respective SDA archive. The descriptor may be represented by a file in specific format, e.g. a file in extensible markup language (XML) file format.

Figure 2:
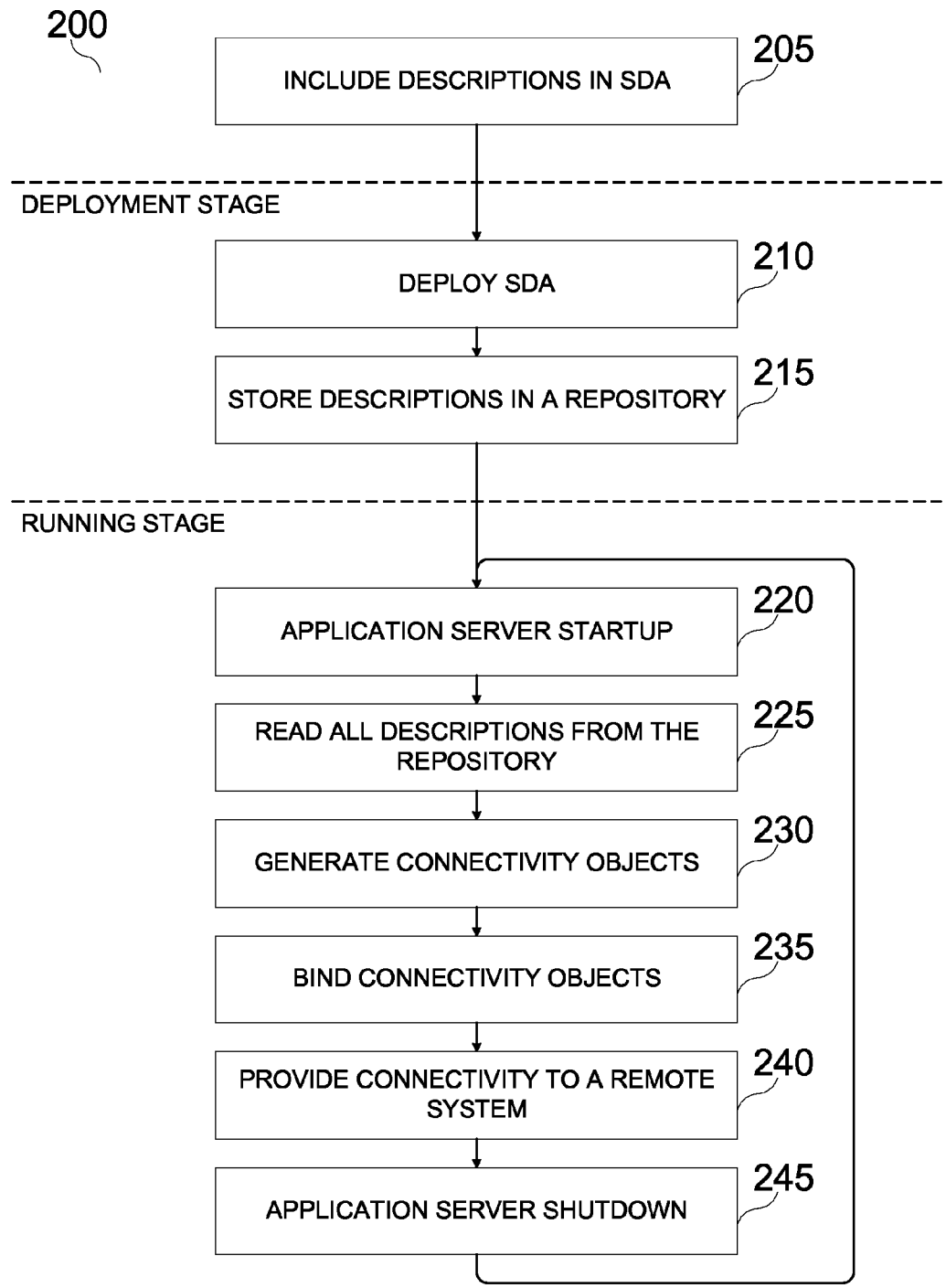
FIG. 2 illustrates a flowchart for including connectivity descriptions in SDAs and using them for establishing connectivity to a remote system in accordance with an embodiment of the invention.

FIG. 2 illustrates a flowchart 200 of the connectivity establishment process. The goal of the connectivity establishment process, or connectivity process for short, is to create a connectivity object in an application server. The connectivity process implies including connectivity object descriptions in a component's SDA at block 205. This is done before the deployment while the component's SDA is constructed. The connectivity objects may be described in separate files (descriptors) in a specific format. Descriptors may be formatted in a custom format or in accordance with standard specifications, e.g. XML file format. For those skilled in the art, it should be appreciated that other appropriate forms for instructing a computer system may be applied.

At block 210 is illustrated the deployment of the software component including installation, adaptation and activation. Further during the deployment stage, at block 215 the connectivity object descriptions are stored in a repository. In one embodiment of the invention, a repository may be a module within the application server, while in another embodiment of the invention a repository may be a separate node of a distributed system, accessible by one or more application servers. For example with reference to distributed system 100, deployer 121 opens archives 130 and installs, adapts and activates service 122 and library 123. Deployer 121 also stores executable software code 142 and connectivity objects descriptors 144 in repository 140. In one embodiment of the invention, the components can be deployed at any one of the plurality of application servers and run on each application server.

The next stage of the connectivity process begins with the start of the application server at block 220. All system modules, including the relevant connectivity service start to instantiate at that moment. Then, at block 225 the connectivity service searches and reads all descriptions of connectivity objects stored in the repository.

Following reading of the descriptions, connectivity service automatically generates the respective connectivity objects at block 230. Afterwards, the connectivity service registers or binds the connectivity objects in a naming service at block 235 to make them available for the components running on the server. As previously described, registration of a connectivity object in a naming service associates a common reference to that connectivity object. This reference is included in a component's executable source code or in a global variable, which provides access to the connectivity object and subsequently to the respective remote system at block 240.

Figure 3:
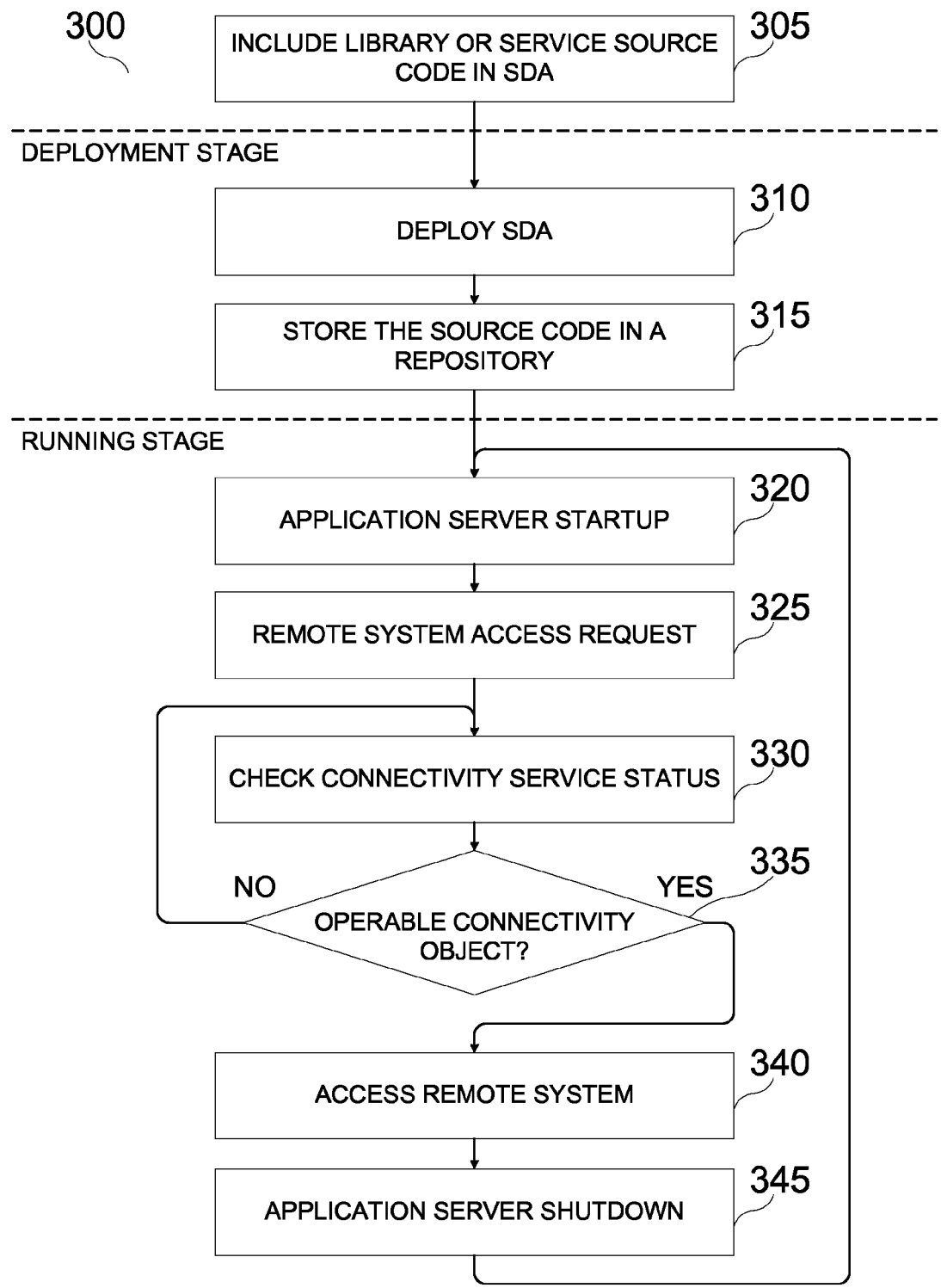
FIG. 3 illustrates a flowchart for using the established connectivity by a plurality of services and libraries, including services and libraries which do not pack the respective descriptions in their SDAs according to an embodiment of the invention.

FIG. 3 illustrates flowchart 300 of a process for deploying on an application server services and libraries components which access connectivity objects established in accordance with descriptions packed in the component's SDAs. Construction of a service or a library SDA is illustrated with block 305. The original function of SDA files is to deliver the component's source code. Blocks 310 and 315 illustrate the deployment stage of the process where the SDAs are deployed in a system and the source code is stored in a system repository. In one embodiment of the invention, the system may resemble the architecture illustrated with FIG. 1.

Services' and libraries' SDA files pack descriptions which contain instructions for automated generation of connectivity objects. A service or a library may access a connectivity object which is not described in its SDA. Regardless of the specific component's SDA with which the descriptions were delivered, they are stored in the repository and the respective connectivity objects may be requested at block 325 by any running component, including the applications. The only necessary precaution for a component to use such connectivity object is to have a reference to the connectivity service at block 330 to ensure at block 335 that it is started and the connectivity object is operable. Then, the remote system is accessed at block 340 through a connection provided by the connectivity object in accordance with one embodiment of the invention.

In the above description numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Reference throughout this specification to "one embodiment" or "an embodiment" means that a particular feature, structure or characteristic described in connection with the embodiment is included in at least embodiment of the invention. Thus, the appearance of the phrases "in one embodiment" or "in an embodiment" in various places throughout this specification are not necessarily all referring to the same embodiment. Furthermore, the particular features, structures or characteristics may be combined in any suitable manner in one or more embodiments.

What is claimed is:

1. A method comprising:
    receiving a first software component source code as a software delivery archive (SDA) to be deployed on an application server of a computer system, wherein the SDA includes a connectivity object description instructing a connectivity service implemented in the application server to establish, during running stage, access to a remote system;
    during deployment stage, deploying the first software component on the application server by generating executable code of the first software component based on the source code included in the SDA;
    storing the connectivity object description in a repository of the application server together with the executable code of the deployed first software component;
    during running stage,
        instantiating the connectivity service at startup of the application server,
        the instantiated connectivity service, searching all descriptions of connectivity objects stored in the repository together with executable code, and
        generating a connectivity object to access the remote system, wherein the connectivity object is generated by the implemented connectivity service based on the connectivity object description stored in the application server repository together with the executable code of the deployed first software component; and
    requesting the generated connectivity object by a second software component executed in the application server to access the remote system.

2. The method of claim 1 further comprising reading from the application server repository properties of the connectivity object description to generate the connectivity object by the connectivity service implemented in the application server to provide at least one connection to the remote system.

3. The method of claim 1 further comprising reading from the application server repository properties of the connectivity object description to generate a connectivity alias pointing to the connectivity object generated by the connectivity service implemented in the application server.

4. The method of claim 1, wherein receiving the first software component source code comprises receiving at least one deployment descriptor file embedded in the SDA, the deployment descriptor file instructing the connectivity service implemented in the application server to establish connectivity to a remote system.

5. The method of claim 4 further comprising including the at least one deployment descriptor file in extensible markup language (XML) format in the SDA.

6. The method of claim 4, wherein the deployment descriptor file comprises instructions to generate connectivity by one or more of a Java Database Connectivity (JDBC) and a Java Messaging Service (JMS) connectivity services implemented in the application server.

7. The method of claim 1, wherein storing the connectivity object description in the application server repository comprises verifying syntax of the connectivity object description based on predefined requirements of the application server.

8. The method of claim 1, wherein generating the connectivity object to access the remote system comprises:
    at the application server startup, reading the connectivity object description from the application server repository;
    generating the connectivity object by the connectivity service implemented in the application server based on the connectivity object description; and binding the connectivity object in a naming service with a reference used by the second software component to address the connectivity object.

9. The method of claim 8, wherein the naming service comprises a Java Naming and Directory Interface (JNDI).

10. The method of claim 1 further comprising checking, by a running service component, for established access to the remote system.

11. A system comprising:
a memory to store executable code; and
a server node to execute the code stored in the memory to:
read source code of a first software component from a software delivery archive (SDA) packing the source code together with an embedded descriptor instructing a connectivity service implemented in an application server to establish connectivity to a remote system, wherein the remote system is accessible via a computer network,
deploy the first software component by generating executable code of the first software component based on the source code packed in the SDA,
store the executable code of the first software component in a repository of the application server together with instructions of the embedded descriptor to establish connectivity to the remote system,
instantiate the connectivity service at startup,
the connectivity service, search all instructions to establish connectivity stored in the repository together with executable code,
generating a connectivity object to access the remote system by the connectivity service implemented in the application server based on the instructions stored in the application server repository, and
handle a communication between a second software component executed in the application server and the remote system via the generated connectivity object.

12. The system of claim 11, wherein the memory comprises executable code which when executed causes the server node further to:
generate the connectivity object by the connectivity service implemented in the application server to provide connectivity to the remote system; and
generate by a naming service implemented in the application server at least one reference associated with the connectivity object, wherein the second software component requests the at least one reference to access the remote system.

13. The system of claim 12 further comprising a plurality of connectivity aliases pointing to corresponding connectivity objects.

14. The system of claim 11, wherein the first software component is a service software component or a library software component.

15. The system of claim 11, wherein the descriptor comprises a deployment descriptor file.

16. The system of claim 15 wherein the descriptor file is in XML format.

17. The system of claim 15 wherein the descriptor file comprises instructions to establish connectivity by one or more of a Java Database Connectivity (JDBC) and a Java Messaging Service (JMS) connectivity services implemented in the application server.

18. A non-transitory computer readable medium storing instructions which when executed cause a computer to:
receive one of a service or a library component source code within a software delivery archive (SDA) to be deployed on a server node in a distributed computer system, wherein the SDA includes a connectivity object description instructing a connectivity service implemented in the server node to establish access to a remote system;
deploy the service or the library component by generating executable code in the server node based on the source code included in the SDA;
store the connectivity object description together with the executable code in a repository of the distributed computer system;
instantiate the connectivity service at a startup of the server node;
the instantiated connectivity service, search all descriptions of connectivity objects stored in the repository together with executable code;
generate a connectivity object to access the remote system, wherein the connectivity object is generated by the connectivity service implemented in the server node based on the connectivity object description stored in the distributed computer system repository; and
handle a communication between an application component executed in the server node and the remote system via the generated connectivity object.

19. The non-transitory computer readable medium of claim 18 storing instructions which when executed cause the computer further to read from the distributed computer system repository properties of the connectivity object description to generate the connectivity object by the connectivity service implemented in the server node to provide at least one connection to the remote system.

20. The non-transitory computer readable medium of claim 18 storing instructions which when executed cause the computer further to read from the distributed computer system repository properties of the connectivity object description to generate a connectivity object alias pointing to the connectivity object generated by the connectivity service.

21. The non-transitory computer readable medium of claim 18, wherein receiving the service or the library component comprises receiving at least one deployment descriptor file embedded in the SDA, the deployment descriptor file instructing the connectivity service implemented in the server node to establish connectivity to a remote system.

22. The non-transitory computer readable medium of claim 21 storing instructions which when executed cause the computer further to include the at least one deployment descriptor file in extensible markup language (XML) format in the SDA.

23. The non-transitory computer readable medium of claim 21, wherein the deployment descriptor file comprises instructions to establish access to a remote system by one or more of a Java Database Connectivity (JDBC) and a Java Messaging Service (JMS) connectivity services implemented in the server node.

24. The non-transitory computer readable medium of claim 18, wherein storing the connectivity object description comprises verifying syntax of the connectivity object description.

25. The non-transitory computer readable medium of claim 18, wherein generating the connectivity object comprises:
reading at the server node startup the connectivity object description from the distributed computer system repository;
generating the connectivity object based on the connectivity object description; and
binding the connectivity object in a naming service with a reference used by a deployed service, a deployed library or a deployed application software component to address the connectivity object.

26. The non-transitory computer readable medium of claim 25, wherein the naming service comprises a Java Naming and Directory Interface (JNDI).

27. The non-transitory computer readable medium of claim 18 storing instructions which when executed cause the computer further to check by a running service component for established access to the remote system.

* * * * *